United States Patent
Hayden et al.

(10) Patent No.: US 6,647,433 B1
(45) Date of Patent: Nov. 11, 2003

(54) ARCHITECTURE AND RELATED METHODS FACILITATING SECURE PORT BYPASS CIRCUIT SETTINGS

(75) Inventors: Douglas Todd Hayden, Boise, ID (US); Jay D Reeves, Lucia Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 527 days.

(21) Appl. No.: 09/638,273

(22) Filed: Aug. 14, 2000

(51) Int. Cl.[7] .................................................. G06F 3/00
(52) U.S. Cl. ............................. 710/5; 710/29; 711/138; 712/225
(58) Field of Search ................................ 710/5, 29, 36, 710/52, 33, 7, 1; 711/100, 118, 138, 139, 225

(56) References Cited

U.S. PATENT DOCUMENTS

| | | | | |
|---|---|---|---|---|
| 4,355,389 A | * | 10/1982 | Sato et al. ..................... | 371/18 |
| 5,109,190 A | * | 4/1992 | Sakashita et al. ........... | 324/158 |
| 5,448,575 A | * | 9/1995 | Hashizume ................. | 371/22.3 |
| 5,703,884 A | * | 12/1997 | Ozaki ......................... | 371/22.3 |
| 5,812,754 A | * | 9/1998 | Lui et al. ..................... | 714/6 |
| 6,005,819 A | * | 12/1999 | Shin ........................... | 365/226 |
| 6,356,984 B1 | * | 3/2002 | Day et al. ................... | 711/147 |

\* cited by examiner

*Primary Examiner*—Jeffrey Gaffin
*Assistant Examiner*—Rijue Mai

(57) ABSTRACT

A method for securing port bypass circuit settings is presented comprising issuing one or more command(s) to one or more inputs of a general purpose input/output (GPIO) system, wherein the command(s) cause a first output of the GPIO system associated with a first input of the multiple inputs to issue a control signal to a latch associated with a port bypass circuit (PBC) addressed in the received command(s), and a second output of the GPIO system associated with a second of the multiple inputs of the GPIO system to issue a clock signal to a latch associated a PBC addressed in the received command(s). If command(s) received at the first and second inputs are consistent with changing the state of a common PBC, the control signal and the clock signal are sent to a single latching device, which latches the control signal to the addressed PBC changing the state of the PBC. If the command(s) are not consistent, the control and clock signal(s) are not received by a common latch, and the PBC states remain unchanged.

5 Claims, 5 Drawing Sheets

ARCHITECTURE AND RELATED METHODS FACILITATING SECURE PORT BYPASS CIRCUIT SETTINGS

TECHNICAL FIELD

This invention generally relates to data networks and, more particularly, to an architecture and related method(s) facilitating secure port bypass circuit (PBC) settings within a data network.

BACKGROUND

Port bypass circuits (PBC) are well known as a reliable means of switching in high-speed data networks. Simplistically speaking, a PBC is a multiplexer that is used within data networks to selectively couple network elements. Port bypass circuits possess several performance attributes such as low-latency switching and minimal jitter accumulation that make them particularly attractive for use in high-speed switching applications. PBCs are often employed to selectively couple network elements to a high-speed data network, drives within a redundant array of independent disks (RAID) system and/or their progeny (e.g., just a bunch of disks (JBOD), storage area networks (SANs)), and the like. An example prior art implementation of a PBC within a distributed storage system is presented with reference to FIG. 1.

FIG. 1 illustrates a block diagram of an example PBC implementation within a distributed storage system 100. For purposes of illustration, the example implementation is a RAID system 100, wherein the PBC's are utilized to selectively couple storage devices to the storage system. As shown, the storage system 100 includes a bus controller 102 coupled to controller 104 (e.g., a backplane controller) via a control bus 106. The backplane controller 104 is coupled to each of the Port Bypass Circuits 110A . . . N via at least one enable line 108A . . . N. As introduced above, the PBC's 110A . . . N are utilized to selectively enable/disable an input/output device (e.g., storage device) 112A . . . N to the RAID system 100. It is to be appreciated that any of a number of alternate networking technologies such as, for example, Ethernet, Fast Ethernet, Gigabit Ethernet, Fibre Channel, etc., may well be used to transfer information within network 100.

In accordance with the illustrated implementation, the bus controller 102 selectively issues instructions to the backplane controller 104 to engage/disengage one or more drives 112A . . . N (e.g., enabling/disabling of a control line on the PBC) from the system 100 via the control bus 106. Based on the control commands received from the bus controller 102, backplane controller selectively enables one ore more PBCs 110A . . . N by asserting an associated enable line 108A . . . N. In accordance with a typical implementation, the control bus 106 is an addressable serial bus such as, for example, an I²C™ serial bus (introduced by Philips, N.A.), and the bus controller 102 is a bus bridge with I²C™ control facilities. In addition, loopback paths are typically implemented in the communication network using the PBC to enable self-testing and troubleshooting of the storage system 100.

One shortcoming of such prior art systems, however, is a lack of programmatic capability at the PBC controller (e.g., the backplane controller of the example RAID system 100). This lack of programmatic intelligence in the backplane controller 104 typically prohibits the use of any "protocol layer" in the control path 106 to ensure data integrity in setting the PBC states. Accordingly, invalid control data caused by noise, a fault in the communication path, I/O errors between controllers 102 and 104, and the like can cause erroneous setting of one or more PBCs 110A . . . N. The resultant undesirable PBC setting is unpredictable and not readily detectable in prior art implementations. Indeed, erroneous setting of a PBC state will typically result in enabling undesired data to stray onto the network communication paths that, at best, causes performance degredation and, at worst, breaks the data path which may require re-arbitration of device(s) or even a re-initialization of the network (e.g., RAID system) to re-establish the communication path.

SUMMARY

In accordance with the teachings of the present invention, an architecture and related methods facilitating secure port bypass circuit settings is presented incorporating the teachings of the present invention. According to a first implementation, a method for securing port bypass circuit settings is presented comprising issuing one or more command(s) to one or more inputs of a general purpose input/output (GPIO) system, wherein the command(s) cause a first output of the GPIO system associated with a first input of the multiple inputs to issue a control signal to a latch associated with a port bypass circuit (PBC) addressed in the received command(s), and a second output of the GPIO system associated with a second of the multiple inputs of the GPIO system to issue a clock signal to a latch associated with a PBC addressed in the received command(s). If command(s) received at the first and second inputs are consistent with changing a common PBC, the control signal and the clock signal are sent to a single latching device, which latches the control signal to the addressed PBC changing the state of the PBC. If the command(s) are not consistent with changing a common PBC, the control and clock signal(s) are not received by a common latch, and none of the PBC states change. According to one exemplary implementation, the signals must also be sent in the order denoted above, i.e., control signal then clock signal in order to effectively change the state of the targeted PBC. In this regard, the claimed invention presents an innovative system and method for securing port bypass circuit settings.

According to one implementation, a method is presented comprising issuing one or more control command(s) to a controller which, when interpreted, causes the controller to issue control signals to a port bypass circuit to control an operational state of the port bypass circuit. Upon verifying that the controller accurately received the one or more control commands, the control signals are passed to the port bypass circuit.

DETAILED DESCRIPTION

In describing the present invention, example network architectures and associated methods will be described with reference to the above drawings. It is noted, however, that modification to the architecture and methods described herein may well be made without deviating from the present invention. Indeed, such alternate embodiments are anticipated within the scope and spirit of the present invention.

Example PBC Control Architecture

Figure 1:
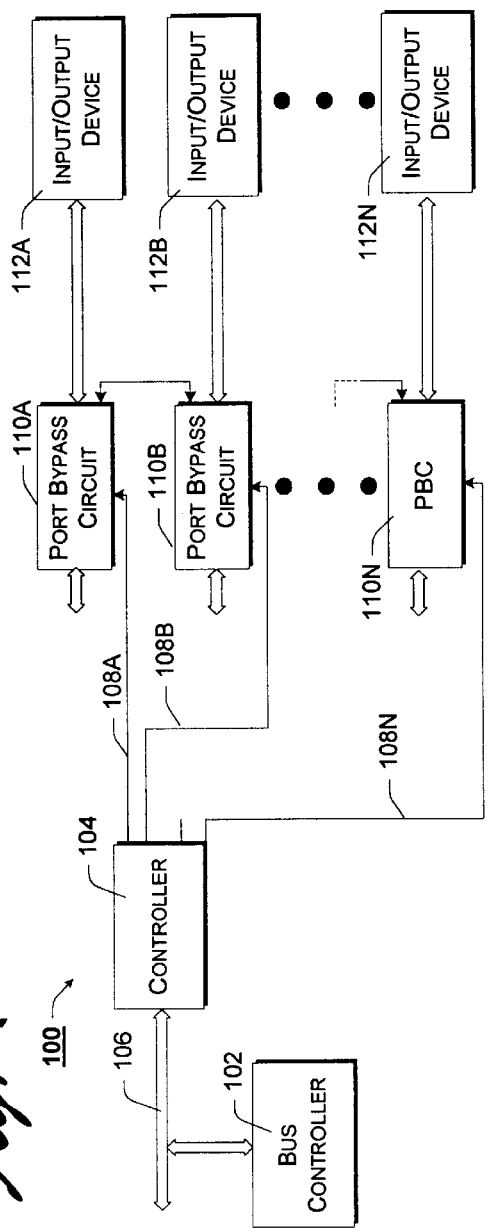
FIG. 1 shows a block diagram of a prior art data network incorporating port bypass circuit(s) (PBC) to selectively couple network elements.
Figure 2:
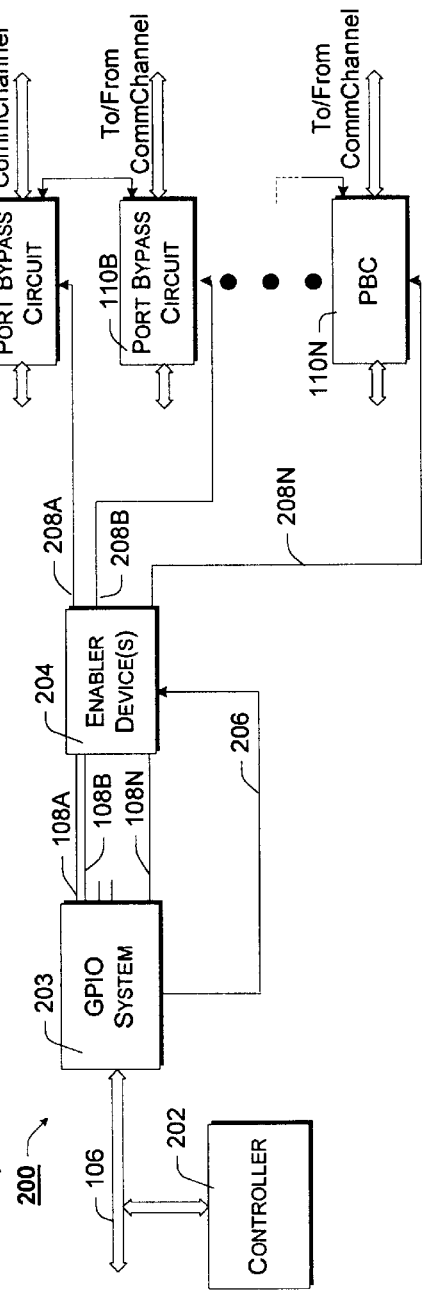
FIG. 2 is a block diagram of a data network network incorporating the teachings of the present invention, according to one implementation of the present invention.

FIG. 2 illustrates a block diagram of an example system 200 facilitating secure port bypass circuit settings, according to one example implementation of the present invention. In accordance with the illustrated example embodiment of FIG. 2, system 200 is similar to that of network 100, i.e., comprising controller 104, control bus 106, enabling lines 108A . . . N, PBCs 110A . . . N, and the like each coupled as depicted. In addition, the system 200 includes general purpose input/output (GPIO) system 203 coupled to one or more enabler device(s) 204. As will be discussed in greater detail below, GPIO system 203 receives a command to change the state of an addressed PBC from controller 102 via at least two input ports. GPIO system 203 interprets the command received from the first input and issues a control signal to a data input of a latch associated with the PBC addressed in the command received at the first input. In addition, GPIO system 203 interprets the command received via the second input and generates a clock signal to a clock input of a latch associated with the PBC addressed in the command received from the second input. If the command is received from by a common latch (i.e., the command received via the first and second inputs address a common PBC), the control signal is latched through enabler 204 to the addressed PBC. In this way, system 200 facilitates the secure modification of PBC state.

As shown, system 200 includes controller 202. According to one implementation, controller 202 is implemented using controller 104, i.e., a standard bus bridge, bus controller, etc. In accordance with another embodiment, controller 202 is an application specific integrated circuit (ASIC) which controls PBC state along with a number of other parameters of a host storage system. According to one implementation, the control commands issued by bus controller 202 instruct GPIO system 203 to place an addressed PBC 110A . . . N in a particular state (e.g., to facilitate communication between a drive and an I/O device, to bypass a drive, etc.). As introduced above, controller 202 issues one or more commands to GPIO system 203 to control assertion of control and clock signal(s) to an enabler device 204 to effectively control the secure the state of PBC(s) 110. In accordance with one embodiment, to be discussed more fully below, controller 202 implements a programmatic command verification feature which automatically verifies the integrity of the issued control commands, before asserting a clock signal to the enabler device(s) 204 and, thus, securing the state of the PBCs 110. According to the example implementation, controller 202 utilizes the I²C serial communication protocol in communications with GPIO system 203.

As used herein, GPIO system 203 is comprised of one or more general purpose input/output devices. An example of a suitable GPIO device is the Vitesse VSC050 commonly available by Vitesse Semiconductor of Camarillo, Calif. As introduced above, GPIO system 203 receives one or more commands via one or more inputs (or, one input at each of two separate GPIO(s) of system 203) which are interpreted to generate control signal(s) and clock signal(s) to enabling device 204 associated with a common PBC 110. According to one aspect of the present invention, the command received to generate each of the clock and control signal(s) must address common latch circuitry within enabling device 204 associated with a single PBC 110 in order for the state of the PBC 110 to be changed. Indeed, according to one implementation, the order of signals is important, i.e., the control signal must be received by enabling device 204 prior to the clock signal in order to effectively change the state of the PBC 110.

Enabler device(s) 204 are intended to represent any of a number of circuits/devices to selectively assert control signal(s) to addressed PBC(s). According to one implementation, enabler device(s) 204 is comprised of a number latch circuits such as flip-flops, one each associated with a PBC 110. In accordance with this implementation, assertion of a control signal and a clock signal is required to latch the control signal to the associated PBC. To protect against the inadvertent assertion of a control signal, the control and clock signals are generated by separate GPIO logic (if not devices) of GPIO system 203 and must both be received by the same flip-flop associated with the addressed PBC. According to one implementation, the flip-flop logic is realized in an appropriately programmed programmable logic device (PLD).

According to a second implementation, PBC enabler 204 is a N:M multiplexer, selectively coupling N enable lines 108A . . . N with M enable lines 208A . . . N. Use of the multiplexer has the advantage of reducing the number of controller enable lines 108A . . . N required, albeit at the expense of an increased command complexity in the I²C™ protocol used between the bus controller 202 and the controller 104 (i.e., to particularly identify the enable line 108A . . . N to use to control a particular PBC).

According to an alternate embodiment of the present invention, controller 202 verifies the integrity of the control command(s) received by GPIO system 203. In accordance with this alternate embodiment, controller 202 utilizes any of a number of error checking protocols such as, for example, cyclical redundancy check (CRC) error detection, utilizing multiple data streams and/or data encoding of the issued control commands to authenticate the integrity of command(s) received at GPIO system 203. According to one implementation, for example, controller 202 calculates a CRC value for a command issued to and echoed by GPIO system 203 to verify that the issued command was accurately received. Upon such verification, controller 202, via GPIO system 203, asserts the clock pulse to an appropriate flip-flop of enabler device(s) 204 to change the state of the addressed PBC 110. If the received command varies by even 1 bit from that issued by the bus controller 202, the CRC value will not match that of the original command, and the clock signal is not issued. In this way, PBC state(s) are secured by introducing an intelligent protocol layer in the communication channel of system 200 facilitating the one or more error checking features.

Figure 3:
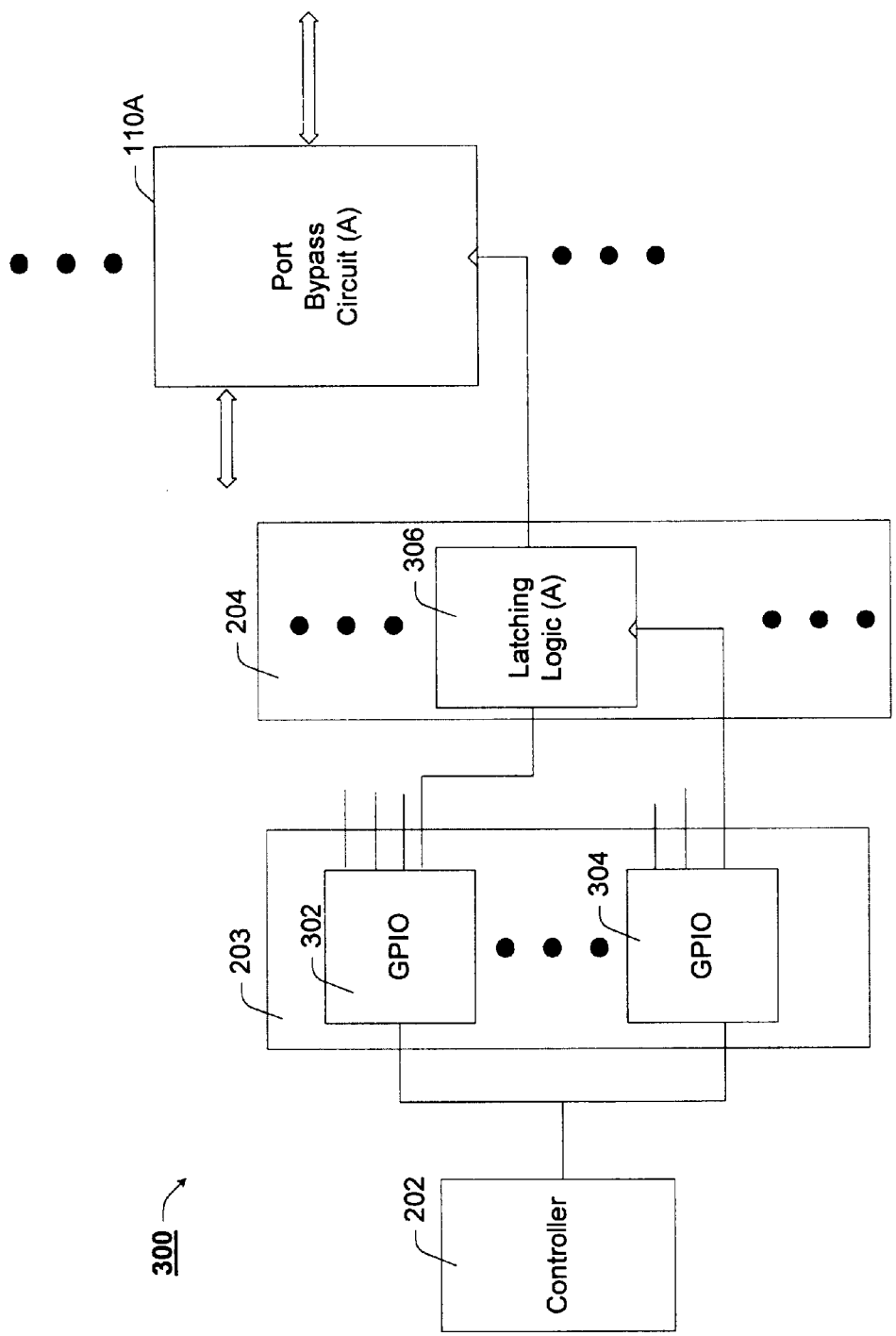
FIG. 3 is a more detailed block diagram of the innovative data network depicted in FIG. 2.

FIG. 3 illustrates a block diagram providing greater detail of system 200, in accordance with one example implementation of the present invention. In particular, FIG. 3 is depicted to denote that GPIO system 203 may well be comprised of a number of individual GPIO devices 302, 304. Similarly, FIG. 3 illustrates enabler device(s) 204 comprised of a plurality of latching logic 306, such as the flip-flops described above.

It is to be appreciated, although illustrated in accordance with a hardware implementation, one or more of the operational elements of FIGS. 2 and 3 may well be implemented by a controller or other execution device executing one or more executable instructions. In this regard, FIGS. 2 and 3 are intended to be illustrative of the present invention limited only by the scope of the claims, appended hereto.

Example Operation and Implementation

Having introduced an example architectural environment with reference to FIGS. 2 and 3, above, reference is now directed to FIGS. 4–7 wherein example methods of operation, communication flow diagrams and timing diagrams are presented in accordance with the teachings of the present invention.

Figure 4:
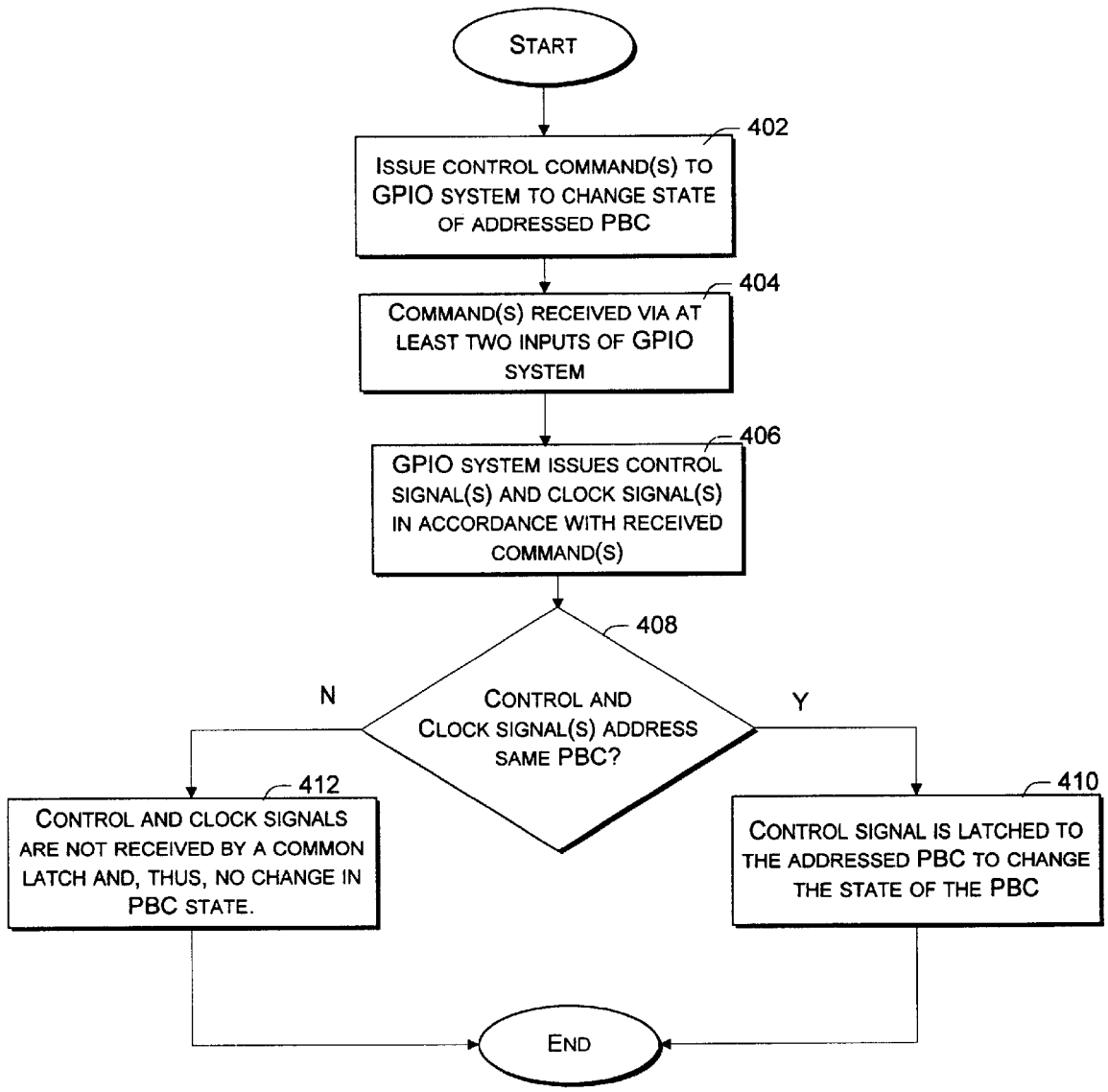
FIG. 4 is a flow chart of an example method of securing Port Bypass Circuit settings, in accordance with one embodiment of the present invention.

FIG. 4 illustrates a flow chart of an example method for the secure control of port bypass circuit settings, in accordance with one example embodiment of the present invention. In accordance with the illustrated example embodiment of FIG. 4, the method begins with block 402 wherein controller 202 issues one or more control command(s) to GPIO system 203 to change the state of an addressed PBC 110. In block 404, the command(s) are received via at least two inputs of GPIO system 203. According to one implementation, a single control command is issued by controller 202 to two separate inputs of GPIO system 203 (i.e., effectively received as two separate commands by different sections of GPIO system 203). In another implementation, controller 202 issues two separate commands to two separate inputs of GPIO system 203.

The command(s) received by GPIO system 203 via separate input paths are interpreted independently. A first of the separate input paths is coupled to a data line of enabler device 204 via GPIO system 203. A second of the input paths is coupled to a clock line of enabler device 204 via GPIO system 203. In accordance with one implementation, depicted in FIG. 3, the first input path is located on one GPIO device 302, while the second input path is located on another GPIO device 304.

In response to the received command(s), the one or more GPIO device(s) of GPIO system asserts control and clock signals to enabler device(s) 204 associated with an addressed PBC 110, block 406. That is, GPIO system 203 identifies the PBC addressed in the received command(s) and issues a control signal (or clock signal) to an enabler device 306 associated with the addressed PBC.

If the received command(s) are consistent with changing a common (single) PBC, the control and clock signal(s) asserted by GPIO system 203 are received by a single enabler device 306, block 408. According to one implementation, to effect the state of the PBC, the signals must be received by enabling device 204 in the order prescribed above, i.e., control signal followed by clock signal. Upon receiving the control and clock signal(s) at a single enabler device 306, the control signal is latched to the addressed PBC to securely change the state of the PBC 110, block 410.

If, however, the received command(s) differ in that they are not consistent with changing the state of a common PBC, the control and clock signal(s) asserted by GPIO system 203 are not received by a common enabler device 306. Since the control and clock signal(s) are not received by a common enabler device 306, the state of the PBCs are not changed, block 412. In this way, system 200 secures the state of PBCs 110.

Figure 5:
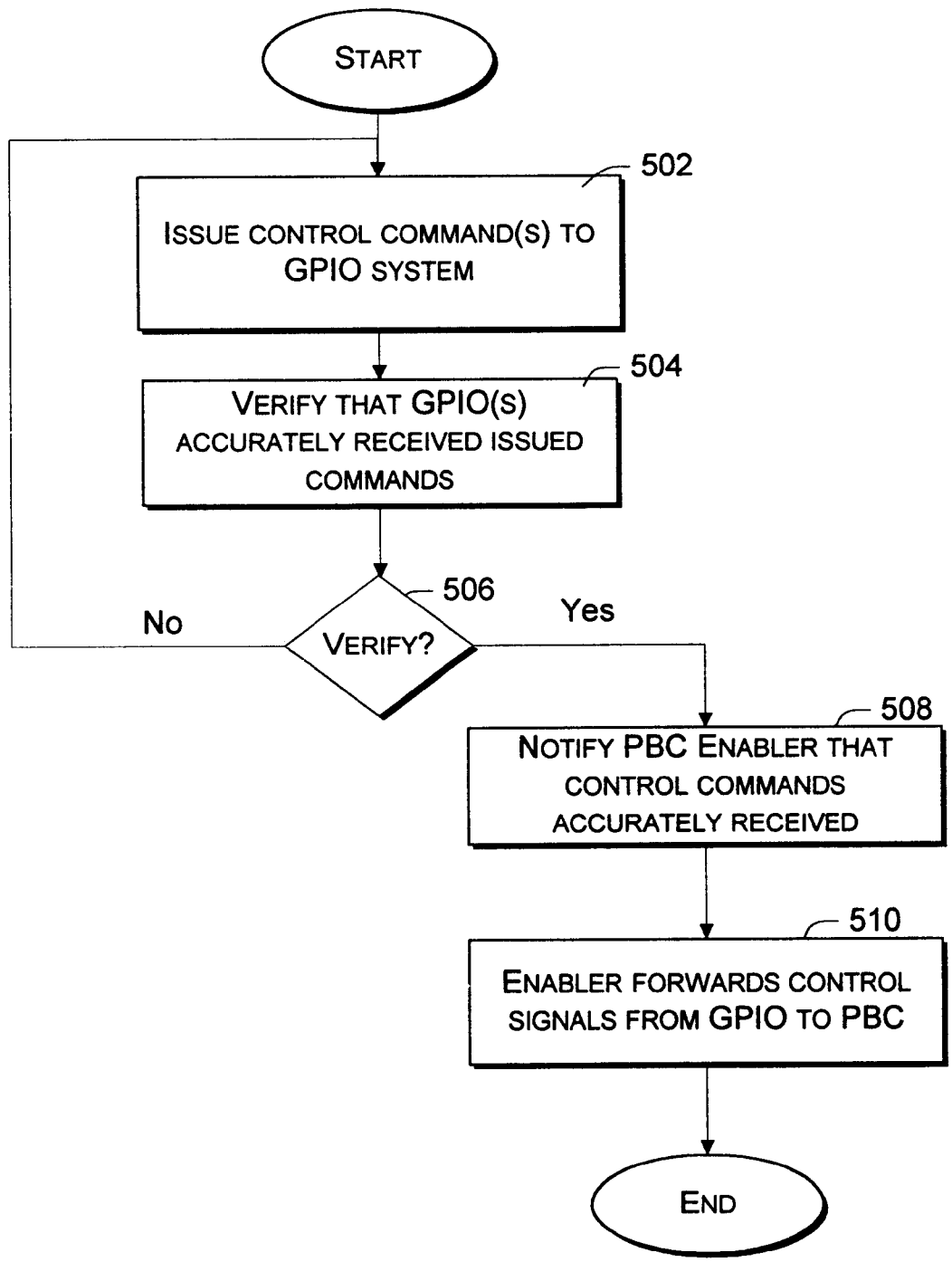
FIG. 5 is a flow chart of an example method for securing Port Bypass Circuit settings, according to an alternate embodiment of the present invention.

FIG. 5 illustrates a flow chart of an example method of securing port bypass circuit settings, according to an alternate implementation of the present invention. For ease of illustration, and not limitation, the method of FIG. 5 will be presented with continued reference to the system architecture depicted in FIG. 2.

As shown, the method begins with block 502 wherein bus controller 202 issues one or more control command(s) to GPIO system 203 to affect the state of one or more PBC(s) 110A . . . N. More specifically, according to one implementation, bus controller 202 issues control command(s) to GPIO system 203 via control bus 106 in accordance with the $I^2C$ communication protocol and utilizing one or more error checking protocols. According to one implementation, bus controller 202 has calculated a CRC value for the one or more control commands issued to GPIO system 203. Upon receipt of control command(s), GPIO 203 generates a control signal for the addressed PBC 110 and issues the control signal to enabler device(s) 204.

In block 504, controller 202 verifies that GPIO system 203 has accurately received the control commands issued in block 502. According to one implementation, GPIO system 203 receives the command(s) and generates a response to the bus controller 202 in accordance with the one or more error checking protocols employed. More specifically, in accordance with the illustrated example embodiment, GPIO system 203 receives the command(s), generates a CRC value for the received command(s) and echoes the CRC value to bus controller 202 over the control bus 106. In an alternate embodiment, GPIO system 203 echoes the control command(s) itself, and the bus controller 202 calculates a second CRC value to compare with the initial CRC value.

In block 506, controller 202 verifies that the command(s) received by GPIO system 203 are accurate, according to the one or more error checking protocols employed. As introduced above, in accordance with the example embodiment, controller 202 compares the CRC value(s) associated with the issued and echoed command(s). If, in block 506, controller 202 verifies that GPIO system 203 has accurately received the commands, controller 202 notifies enabler device(s) 204 to pass the control signal generated by GPIO system 203, block 508. According to one implementation, controller 202 issues a control signal to GPIO system 203 to issue a clock signal to enabler device(s) 204, thereby clocking the control signal to the addressed PBC. In block 510, enabler device 204 latches the control signal received from GPIO system 203 to the addressed PBC 110.

If, in block 506, controller 202 is unable to verify that GPIO system 203 has accurately received the issued command(s), the process continues with block 502 as controller 202 re-issues the command(s). According to one implementation, the process of blocks 502–506 repeat until controller 202 verifies that the GPIO system 203 has accurately received the command(s) issued, thereby securing the integrity of the PBC settings and ensuring that extraneous data is not leaked to the network 200.

It is to be appreciated, based on the foregoing, that use of the error checking protocol(s) in association with the PBC enabler 204 serve to improve the certainty that the PBCs 110A . . . N are being properly set by the controller 202. In this regard, the system 200 and methods 400 and 500 described herein reduce the likelihood of extraneous data on the network communication channel, improving system performance.

Figure 6:
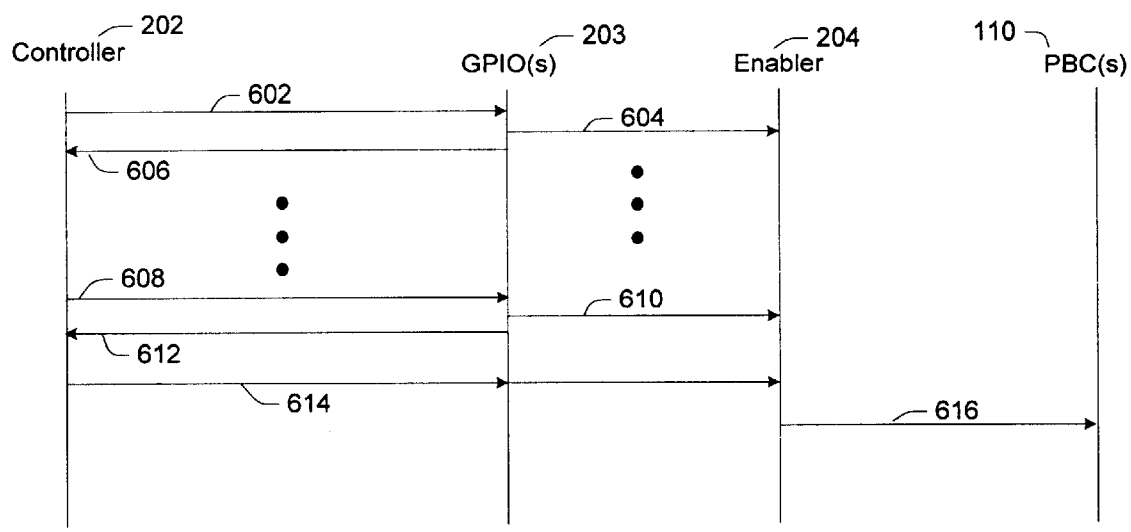
FIG. 6 is a communication flow diagram illustrating an example communication exchange between select elements of storage system facilitating secure port bypass circuit settings.

FIG. 6 graphically illustrates an example communication flow diagram for illustrating an example communication flow sequence associated with FIG. 5, in accordance with the teachings of the present invention. In accordance with FIG. 6, controller 202 issues control command(s) (602) and attempts to verify that they are accurately received by GPIO system 203 (606) in an iterative fashion until an issued control command(s) (608) is verified to have been accurately received (612). At which point, controller 202 issues a signal (614) to enabler device(s) 204 (via GPIO system 203) to latch control signal (610) received from GPIO system 203 to PBC(s) 110A . . . N (616). In this manner, only those commands which are verified accurate are effectively implemented at the PBCs 110A . . . N.

Figure 7:
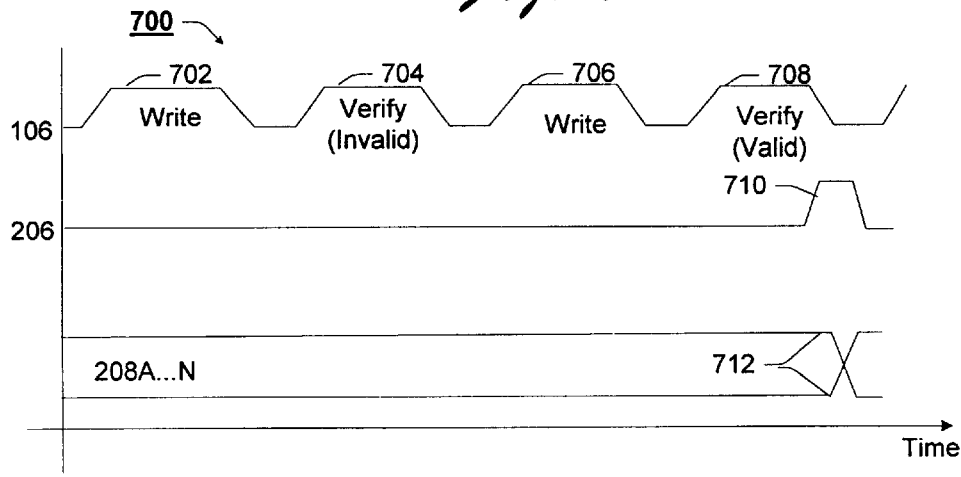
FIG. 7 is a timing diagram of an example communication exchange between select elements of a storage system to facilitate secure port bypass circuit settings.

FIG. 7 graphically illustrates an example timing diagram associated with the method of FIG. 5, according to one implementation of the present invention. As shown, a number of write/read iterations 702–706 are performed until bus controller 202 verifies that GPIO system 203 has accurately received the issued command (708). Once controller 202 has verified the received command, controller 202 instructs (710) enabler device(s) 204 to transfer the information from enabling lines 108A . . . N to PBC enabling lines 208A . . . N, reference 712. At reference 712, the PBC enable bits change state in accordance with the issued control command.

Although the invention has been described in language specific to structural features and/or methodological acts, it is to be understood that the invention defined in the appended claims is not necessarily limited to the specific features or steps described. Rather, the specific features and steps are disclosed as example forms of implementing the claimed invention. Moreover, it is to be appreciated that one or more structural and/or functional elements described above may well be combined to effect the claimed invention. In one alternate implementation, for example, the enabler device(s) 204 (or enabler function) is incorporated into an innovative controller, wherein received commands are not acted upon until authenticated by an issuing element. In this regard, modification to the above described embodiments may well be made without deviating from the spirit and scope of the present invention.

What is claimed is:

1. A method comprising:

issuing one or more control command(s) to a controller which, when interpreted causes the controller to issue control signals to a port bypass circuit to control an operational state of the port bypass circuit;

verifying that the controller accurately received the one or more control commands before the control signals are passed to the port bypass circuit;

wherein verifying that the controller accurately received the one or more control commands comprises:

receiving a response to the issued one or more commands; and comparing the response to identify deviation from the issued one or more commands.

2. A method according to claim 1, wherein the response is generated in accordance with an error checking protocol.

3. A method according to claim 2, wherein the error checking protocol is zero or more of a CRC value, or an encoded command.

4. A method comprising:

issuing one or more control command(s) to a controller which, when interpreted causes the controller to issue control signals to a port bypass circuit to control an operational state of the port bypass circuit;

verifying that the controller accurately received the one or more control commands before the control signals are passed to the port bypass circuit;

issuing a control signal to a latch, selectively coupling the controller to one or more port bypass circuit(s), upon verification that the received one or more control command(s) are accurate; and applying the control signals to the port bypass circuit(s).

5. A storage system comprising:

a controller, to issue a command to change a state of a port bypass circuit (PBC);

a general purpose input/output (GPIO) system, coupled to the controller, to receive the issued command via a first input and a second input, to generate a control signal to a latch associated with a PBC addressed by the command received via the first input, and to generate a clock signal to a latch associated with a PBC addressed by the command received via the second input, wherein the state does not change unless the first input and the second input receive the command unchanged; and wherein the issued command is an I²C™ command instructing the GPIO system to change the state of an addressed PBC, and wherein the state of the PBC does not change unless the control signal and the clock signal are received by a single latch associated with the addressed PBC.

* * * * *